Patented Jan. 8, 1952

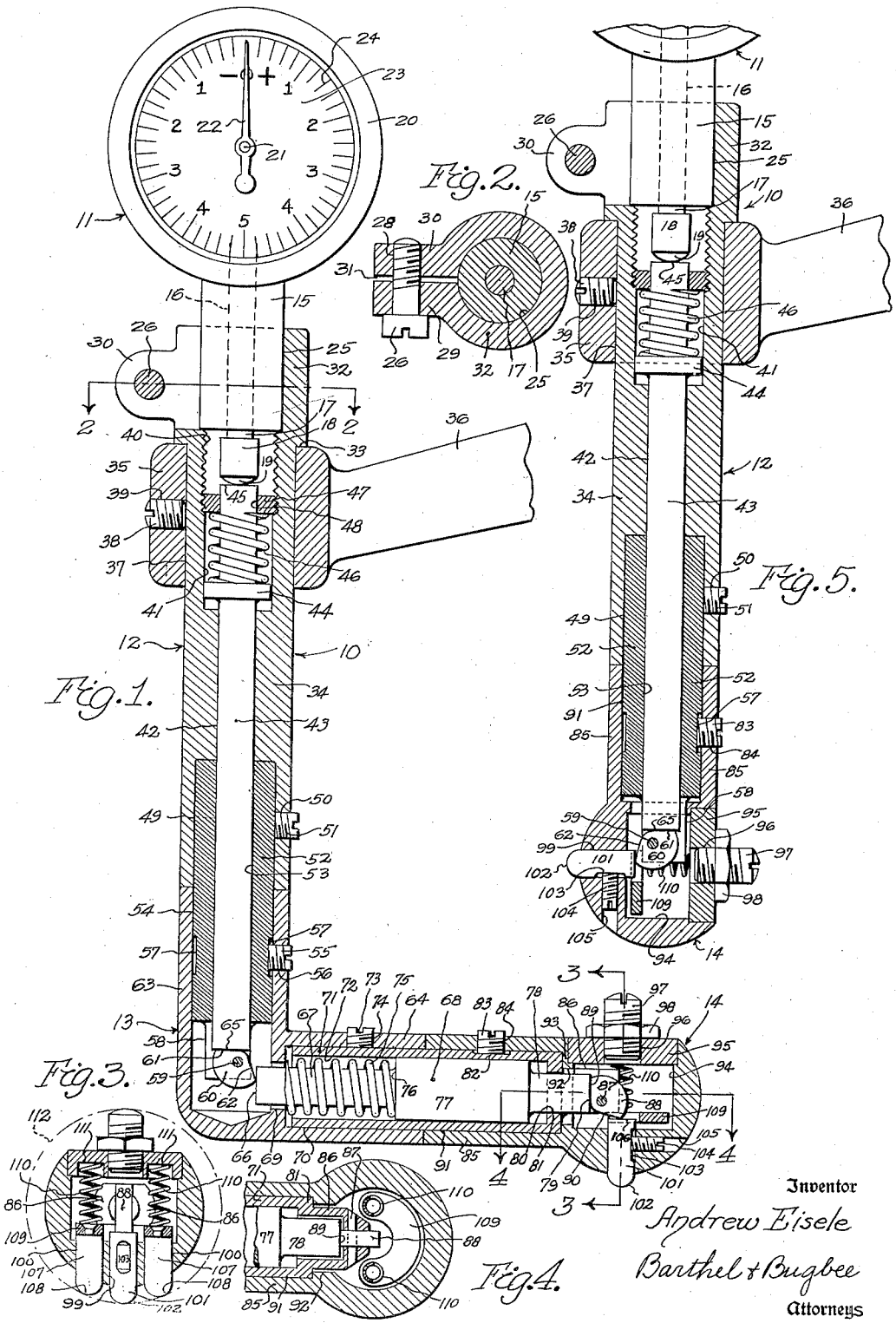

2,581,473

UNITED STATES PATENT OFFICE 2,581,473

COMBINATION OFFSET AND STRAIGHT INTERNAL BORE GAUGE

Andrew Eisele, Detroit, Mich.

Application August 21, 1947, Serial No. 769,885

1 Claim. (Cl. 33—178)

This invention relates to gauges and in particular to internal bore gauges.

One object of this invention is to provide a combination offset and straight internal bore gauge which may be quickly converted from one type to the other merely by adding or removing a quickly-detachable elbow fitting or adapter between the measuring head and the gauge body which carries the dial indicator.

Another object is to provide an improved mechanism for transmitting motion from the measuring head to the dial indicator of an internal bore gauge, this improved mechanism minimizing mechanical errors.

Another object is to provide a combination offset and straight internal bore gauge having a tubular body carrying a dial indicator at one end and an elbow at the other end with a measuring head on the elbow such that any one or all of the head, elbow and dial indicator may be turned completely around or adjusted to any desired angle, thereby adapting the gauge to the measurement of bores in almost inaccessible locations.

Another object is to provide a combination offset and straight internal bore gauge as set forth in the preceding objects, wherein the motion-transmitting mechanism is such that the axis of the measuring head may be placed or constructed at any angle relatively to the axis of the tubular gauge body carrying the dial indicator, the angle between these axes being not necessarily a right angle.

In the drawings:

Figure 1 is a central vertical section through a combination offset and straight internal bore gauge according to a preferred form of the invention, with the elbow adapter or attachment in position for offset measurements;

Figure 2 is a cross section along the line 2—2 in Figure 1, showing the dial indicator mounting;

Figure 3 is a vertical section through the measuring head, taken along the line 3—3 in Figure 1;

Figure 4 is a horizontal section through the measuring head taken along the line 4—4 in Figure 1; and Figure 5 is a fragmentary central vertical section through the gauge shown in Figure 1 with the elbow attachment or adapter removed and the measuring head mounted directly upon the tubular gauge body for straight measurements.

Referring to the drawings generally, Figures 1 and 5 show a preferred form of the combination offset and straight internal bore gauge, generally designated 10, according to a preferred form of the invention. The gauge 10 consists generally of a dial indicator 11 mounted on one end of a tubular body 12, the opposite end of which optionally carries an elbow attachment or adapter 13 which is removable and which, when used (Figure 1), carries on its outer end a measuring head 14. Figure 5 shows the dial indicator gauge 10 when the elbow attachment or adapter 13 has been removed and the head 14 mounted directly upon the tubular gauge body 12, as explained below.

Referring to the drawings in detail, the dial indicator 11, shown in side elevation in Figure 1, is of a conventional type whose details form no part of the present invention. The dial indicator 11 consists of a hollow stem 15 having a bore 16 in which a plunger 17 is reciprocable. One end of the plunger 17 carries an enlargement 18 with a rounded contact portion 19. The other end of the plunger (not shown) enters the cylindrical dial indicator casing 20 and transmits its motion through conventional multiplying mechanism (not shown) to a shaft 21 carrying a pointer or needle 22. A rotatable dial 23 with graduations 24 indicates the travel of the plunger 17 in some accepted standard of measurement, such as thousandths of an inch, the dial 23 being rotatable manually in order to set the needle 22 to read upon zero.

The gauge body 12 is of tubular form and at its upper end is provided with a cylindrical socket 25 into which fits the stem 15 of the dial indicator 11. The latter is clamped in position by means of a set screw 26 passing through a bore 27 into a co-axial threaded bore 28 formed respectively in ears 29 and 30 (Figure 2) projecting laterally from the upper end of the gauge body 12 and separated from one another by a radial slot 31 extending inward into the socket 25.

The socket 25 is formed in the enlarged upper end 32 of the gauge body 12, and terminates in an annular shoulder 33 (Figure 1) where it joins the reduced diameter portion 34 of the gauge body 12. Mounted on the upper part of the reduced diameter body portion 34 in abutment with the annular shoulder 33 is the hub 35 of a handle 36, the hub 35 being bored as at 37 for the passage of the gauge body portion 34. A set screw 38 threaded in a transverse bore 39 leading into the bore 37 secures the handle 36 in position.

Immediately below the socket 25 the gauge body 12 is provided with a threaded bore 40 (Figure 1) which in turn opens into an unthreaded bore 41, the latter at its lower end opening into a reduced diameter smooth bore 42.

Reciprocably mounted in the bore 42 is a motion-transmitting rod 43 having an enlarged head 44 located within the bore 41. The rod 43 at its upper end 45 engages the rounded end 19 on the enlargement 18 of the dial indicator plunger 17 and transmits its motion thereto. Surrounding the upper portion of the rod 43 within the bore 41 is a spiral compression spring 46, one end of which engages the enlarged head 44 and urges it downward while the other end engages a collar 47 threaded into the threaded bore 40 and having a central hole 48 for the passage of the rod 43.

The lower end of the bore 42 opens into an enlarged socket or counterbore 49 (Figure 1), the side wall thereof being provided with a threaded hole 50 containing a set screw 51. Mounted in the counterbore 49 is the upper end of a tubular stem 52 having a bore 53 through which the lower end of the motion-transmitting rod 43 passes. The lower end of the stem 52 is secured in the vertical bore 54 of the elbow attachment or adapter 13 by means of a set screw 55 threaded into a hole 56 and engaging a flat portion 57 formed in the stem 52 to prevent rotation thereof.

Extending downward from the lower end of the stem 52 is a pair of spaced arms 58 (one only being shown) which are bored to receive a cross pin or pivot pin 59 upon which is mounted a motion-transmitting sector 60. The sector 60 is provided with a pair of contact edges 61 and 62 mounted at an angle to one another, preferably an angle slightly greater than a right angle in the event that the arms 63 and 64 of the elbow attachment or adapter 13 form a right angle (Figure 1). The lower end 65 of the rod 43 engages the sector edge 61 whereas the sector edge 62 at its point engages the rearward end 66 of the reduced diameter portion 67 of the elbow motion-transmitting rod 68.

The rod portion 67 passes through a hole 69 in the side wall of the bore 54 and enters the horizontal elbow bore 70 in the horizontal arm 64. The bore 70 receives a cup-shaped sleeve 71 (Figure 1) which is provided with an internal bore 72 in which the rod 68 is reciprocably mounted. A set screw 73 threaded into a transverse hole 74 locks the sleeve 71 in any desired position. Mounted on the reduced diameter rod portion 67 is a compression coil spring 75, one end of which engages the surface around the hole 69 whereas the other end engages the annular shoulder 76 between the reduced diameter portion 67 and the main portion 77 of the rod 68. The opposite end of the rod 68 is provided with a reduced diameter portion 78 (Figure 1) having a contact end 79. The reduced diameter portion 78 passes through a hole 80 in the end wall 81 of the cupped sleeve 71, the latter being provided with a flat spot 82 engaged by a set screw 83 threaded through a hole 84 in the tubular shank 85 of the measuring head 14 to clamp the sleeve 71 in position and prevent its rotation.

Projecting from the outer end wall 81 of the sleeve 71 is a pair of approximately semi-cylindrical spaced arms 86 (Figures 3 and 4), the forward ends of which are tapered and bored to receive a pivot pin 87 upon which is mounted a motion-transmitting sector 88. The sector 88 is provided with contact edges 89 and 90 similar to the contact edges 61 and 62 of the sector 60 and arranged at a similar angle to one another. The edge 89 is engaged by the end 79 of the rod 68 (Figures 1 and 4).

The tubular shank 85 is provided with a bore 91 co-extensive with the bore 70 (Figure 1) and similarly receiving the sleeve 71. The reduced diameter portion 78 of the rod 68 passes through a hole 92 in the end wall 93 of the shank 85, which serves as an abutment for the end wall 81 of the sleeve 71. The head 14 is approximately in the form of a partial sphere and contains a cylindrical cavity 94 which is closed at its upper end by a disc 95 having a central bore 96 into which a threaded fixed contact pin 97 is screwed and locked in position by a lock nut 98 (Figure 1).

The head 14 is provided with a central bore 99 (Figure 3) and a pair of parallel outer bores 100. Reciprocably mounted in the central bore 99 is a reciprocable measuring pin 101 having a rounded end 102 and a longitudinal flat spot 103 engaged by the inner end of a set screw 104 (Figure 1) threaded into the bore 105 to prevent rotation of the measuring pin 101. The upper end 106 of the measuring pin 101 engages the corner or point of the contact edge 90 of the sector 88.

Reciprocably mounted in the bores 100 is a pair of locating pins 107 (Figure 3), the lower ends of which are rounded as at 108. The upper ends of the locating pins 107 are interconnected by an arcuate bridge member 109 secured thereto (Figure 4). Coil springs 110 seated at their upper ends in sockets 111 (Figure 3) in the disc 95 and at their lower ends engaging the bridge member 109 urge the latter and its locating pins 107 outward through the bores 100.

In the operation of the invention, let it be first assumed that the internal bore gauge 11 is to be employed in its offset form shown in Figure 1, with the elbow attachment or adapter 13 in the position shown therein. The operator grasps the handle 36 and, having set the dial graduations 24 at zero relatively to the needle 21, inserts the measuring head 14 into the bore to be measured. The measuring pin 101 is urged downward by the coil spring 75, rod 68 and sector 88, until its rounded end 102 engages the internal bore 112 to be measured (Figure 3), the fixed pin 97 and the locating pins 107 cooperating to cause the axis of the pins 97 and 101 to lie accurately along a cross diameter of the bore 112. The motion of the pin 101 is transmitted through the sectors 88 and 60 and the rods 68 and 43 to the dial indicator plunger 17 and is registered upon the graduations 24 of the dial 23.

In order to reach ordinarily inaccessible positions, the head 14 may be rotated relatively to the elbow attachment or adapter 13 by loosening the set screw 73 and tightening it again when the desired turning of the head 14 around its shank 85 has been accomplished. Similarly, the arm 63 of the elbow attachment or adapter 13 may also be rotated relatively to the tubular gauge body 12 by loosening the set screw 51 and retightening it when the desired position has been reached. The dial indicator 11 may also be rotated so that its dial 23 is visible most conveniently by loosening the set screw 26 and retightening it when the desired position has been reached.

To convert the gauge 10 to the straight form shown in Figure 5, the operator unscrews the set screws 55 and 83 (Figure 1) so that their ends are at least flush with the bores 54 and 91 respectively. The head 14 may then be withdrawn from its telescoping engagement with the sleeve 71, and in the same manner, the elbow adapter or attachment 13 may be withdrawn from engagement with the tubular stem 53. The elbow adapter or attachment 13 is then stored in any convenient place, such as the case of the instrument, and the tubular shank 85 of the head 14 is mounted in telescoping relationship upon the lower end of the stem 52, replacing the tubular arm 63 of the elbow adapter or attachment 13. The parts now occupy the positions shown in Figure 5, and the set screw 83 may now be tightened against the flat spot 57 of the stem 52 in order to lock the head 14 in position.

The head 14 in the straight arrangement of the gauge 10 shown in Figure 5 may also be rotated relatively to the body portion 12 by loosening the set screw 51. The latter is retightened when the head 14 has been rotated to the desired position. The dial indicator 11 may also be rotated relatively to the body 12 by loosening the set screw 26 in the manner described above.

The present invention, therefore, provides an internal bore gauge which is quickly convertible from an offset gauge to a straight gauge and vice versa. The motion-transmitting mechanism is simple yet effective, and reduces errors to a minimum. The dial indicator and the measuring head may be turned relatively to the gauge body, and these may further be turned relatively to the elbow adapter or attachment if it is being used at the moment. In this manner, the gauge is adapted to the measurement of bores which are otherwise inaccessible, and the graduations can be easily read by placing the dial of the dial indicator in the most convenient position. If desired, an elbow adapter having an acute angle or an obtuse angle between the arms may be employed in place of the right angle form 13 shown in Figure 1. Different lengths of interchangeable fixed contact pins 97 are provided in order to permit the most efficient measurement of different ranges of bore diameters.

What I claim is:

A combination straight and offset internal bore gauge comprising an elongated body structure, a dial indicator mounted thereon, an elbow structure removably mounted on said body structure, a measuring head structure removably mounted on said elbow structure, a fixed measuring pin and a movable measuring pin mounted in said head structure, and motion-transmitting mechanism mounted on and extending through said structures, said mechanism operatively interconnecting said dial indicator and said movable measuring pin, said mechanism including an elongated reciprocable motion-transmitting rod mounted in said body structure and operatively connected to said dial indicator, and a sector-shaped motion-transmitting member pivotally mounted on one of said structures and having contact edges disposed at an obtuse angle relatively to one another, one of said contact edges engaging said movable measuring pin and the other contact edge engaging said rod, said body structure and said head structure having mating stem and socket portions thereon and said elbow structure having stem and socket portions thereon mating with the stem and socket portions of said body and head structures, whereby said measuring head structure is interchangeably mountable on said body structure in place of said elbow structure.

ANDREW EISELE.

REFERENCES CITED

The following references are of record in the file of this patent:

UNITED STATES PATENTS

| Number | Name | Date |
|---|---|---|
| 1,804,383 | Litterio | May 5, 1931 |
| 2,268,579 | Eisele | Jan. 6, 1942 |
| 2,333,128 | Robins | Nov. 9, 1943 |
| 2,419,433 | Aller | Apr. 22, 1947 |

FOREIGN PATENTS

| Number | Country | Date |
|---|---|---|
| 190,458 | Switzerland | Apr. 30, 1937 |
| 92,613 | Sweden | June 21, 1938 |
| 541,129 | Great Britain | Nov. 13, 1941 |